June 10, 1924.

J. M. HOUGH ET AL

EMERGENCY AIR BRAKE

Filed Feb. 20, 1924

Inventors
J.M.Hough
and E.M.Sharp

Attorney

June 10, 1924. 1,497,212

J. M. HOUGH ET AL

EMERGENCY AIR BRAKE

Filed Feb. 20, 1924 2 Sheets-Sheet 2

Inventors
J. M. Hough
E. M. Sharp

By D. Swift
Attorney

Patented June 10, 1924.

UNITED STATES PATENT OFFICE.

JOSEPH M. HOUGH AND EDWARD M. SHARP, OF YOAKUM, TEXAS.

EMERGENCY AIR BRAKE.

Application filed February 20, 1924. Serial No. 694,044.

*To all whom it may concern:*

Be it known that we, JOSEPH M. HOUGH and EDWARD M. SHARP, citizens of the United States, residing at Yoakum, in the county of Lavaca, State of Texas, have invented a new and useful Emergency Air Brake; and we do hereby declare the following to be a full, clear, and exact description of the invention, such as will enable others skilled in the art to which it appertains to make and use the same.

The invention relates to air brake systems for railway cars and has for its object to provide a device of this character comprising a frangible member, preferably formed from cast iron piping and disposed adjacent the wheel of a car above the rail, whereby when said wheel leaves the rail, the frangible member will come into engagement with the rail and be broken thereby allowing the exhaust of air from the air brake system and consequent setting of the emergency brakes.

A further object is to form the frangible member from a T-shaped pipe preferably cast from cast iron and having its transverse portion positioned transversely of the rail adjacent the wheel of the car, and its other portion or arm inclining upwardly and away from the rail and provided with a weakened portion thereby insuring the breaking of the frangible member when the transverse portion thereof engages the rail.

A further object is to provide means whereby the T-shaped frangible member may be easily and quickly attached to a car, and means whereby the escaping air may be cut off from any particular emergency brake after breaking thereof.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
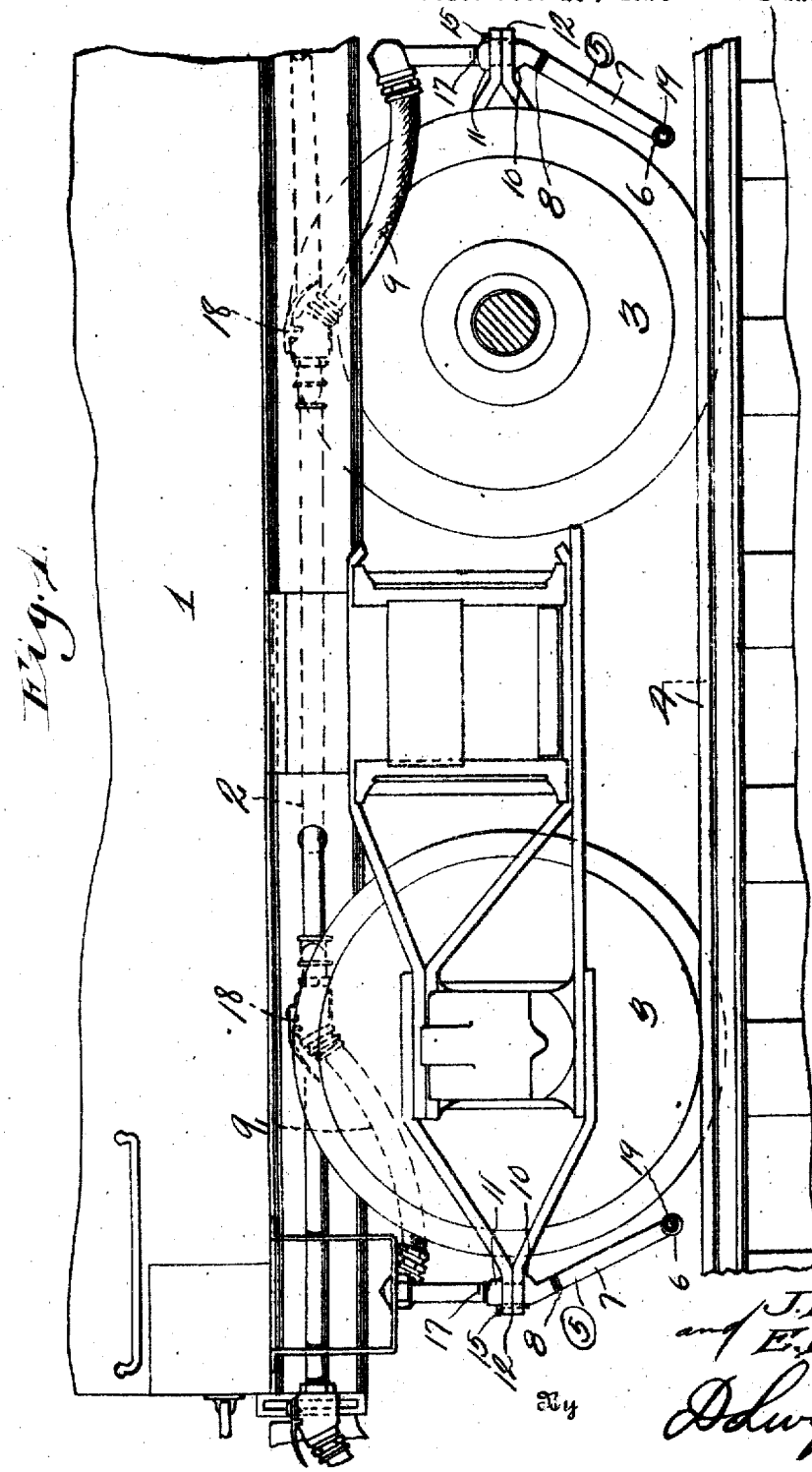
Figure 1 is a side elevation of one end of a conventional form of freight car, showing the emergency device applied thereto.
Figure 2:
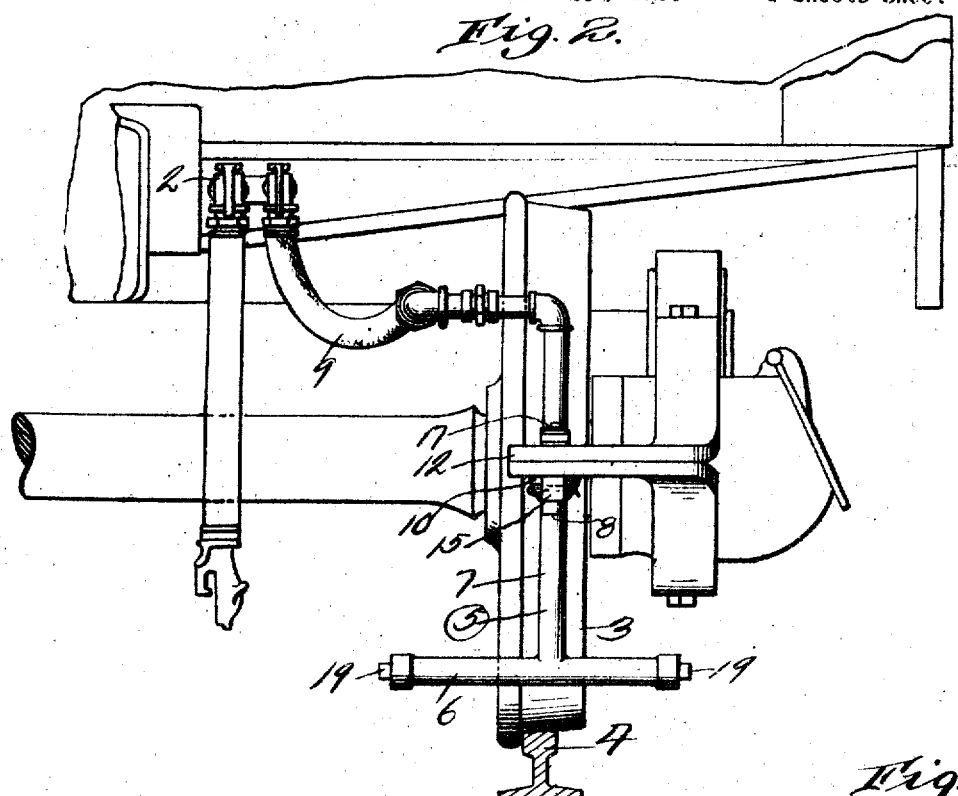
Figure 2 is an end view of a portion of the freight car, showing the device applied thereto.
Figures 3, 4:
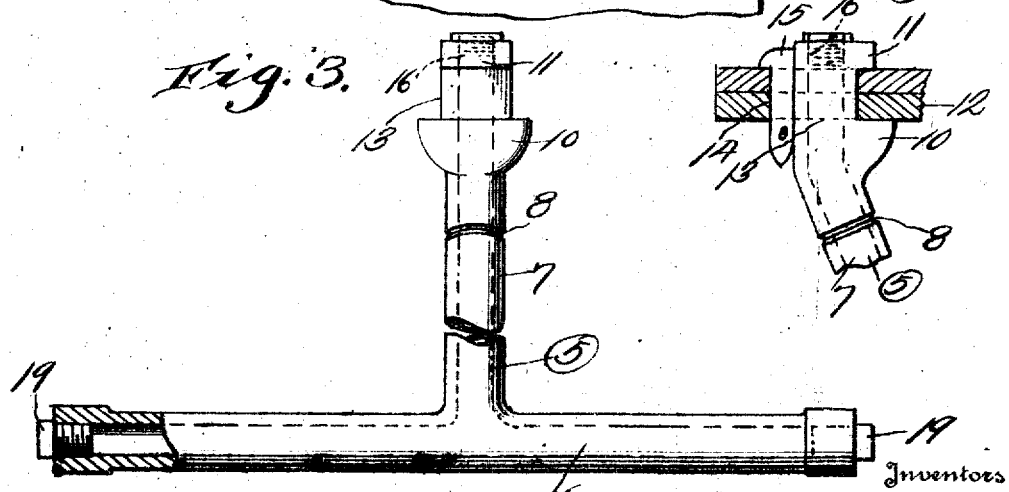
Figure 3 is an enlarged front elevation of the frangible T-shaped member.
Figure 4 is an enlarged side elevation of the upper end of the T-shaped member.

Referring to the drawing, the numeral 1 designates a conventional form of freight car, and 2 the air brake air pipe for controlling air brakes in the usual manner, that is while pressure is on the line, brakes are held in inoperative position, and when pressure is lost on the pipe line the brakes are set in the usual manner. It has been found that where the car wheels 3 leave the rails 4 incident to spreading of the rails or other causes, the train continues a considerable distance before this condition is discovered and the train is often turned over or ditched. To obviate this difficulty and immediately set the brakes when the wheels leave the rails, a T-shaped pipe 5 is provided, which pipe is formed preferably from a frangible material, for instance cast iron. The T-shape pipe 5 has its transverse portion 6 extending across the rail 2 adjacent the wheel 3 and is of sufficient length whereby no matter which side of the wheel 3 drops in relation to the rail 2, it will be engaged by said rail, and its grooved upwardly extending portion 7 broken at 8, at which point the portion 7 is considerably weakened by the groove, thereby allowing the rapid flow of air from the pipe line 2 through the branch pipe 9 to the atmosphere, and consequently setting the brakes. The T-shaped member 5 inclines upwardly at an angle other than a perpendicular, and consequently will easily brake when the same comes into engagement with the rail 4. The upper end of the portion 7 of the T-shaped member is provided with spaced lugs 10 and 11, which lugs engage the upper and lower sides of the supporting bracket 12 after the vertical portion 13 has been passed through an enlarged aperture 14 in the bracket, and after which the key 15 is forced through said aperture 14 and the T shaped member securely held in position. The lug 10 larger than the lug 11 and consequently during the breaking operation at 8, the strain, which is a twisting or bending one is primarily on the under side of the bracket 12. The upper end of the portion 13 of the T-shaped member 5 is internally threaded at 16 for the reception of the end 17 of the branch pipe 9, therefore it will be seen that the branch pipe may be easily and quickly applied to the device. After the brakes have been set by the breaking of the T-shaped member, and the train stopped by the setting of the brakes, the escape of air may be stopped by closing the valve 18 carried by the branch pipe 2, and a new T-shaped pipe 5 placed in position, or the pipe replaced when the car is in a shop or the like. The T-shaped pipes are preferably disposed adjacent the forward and rear wheels of a truck, and preferably at diametrical positions, thereby providing one frangible device at one side of truck at the forward side, and a frangible device at the rear end of the truck at the other side thereof, consequently, no matter which wheel leaves the rail, one of the devices will be operated.

The T-shaped pipe 5 is preferably hollow as shown, and formed from cast iron so it will easily fracture and shatter at the point 8 or in any other place, and the ends of the transverse portions 6 are closed by plugs 19.

From the above it will be seen that a device is provided in connection with the air brake system of a train whereby the brakes will be immediately set when any of the wheels of any of the cars leave the track, also the device may be easily and quickly applied to a conventional form of car without modifying the construction of the car. Although the device has been illustrated and described in connection with a freight car, it may be applied to any kind of railroad car.

The invention having been set forth what is claimed as new and useful is:—

A brake setting device for railroad cars comprising a T-shaped member having a chamber therein and inverted, the transverse portion of the T-shaped member being disposed above a rail, a supporting bracket, the upper end of said T-shaped member extending through an enlarged opening in said bracket, a key disposed in said opening, lugs carried by the T-shaped member and engaging the upper and lower sides of the supporting bracket and a weakened portion carried by the T-shaped member adjacent the bracket.

In testimony whereof we have signed our names to this specification in the presence of two subscribing witnesses.

JOSEPH M. HOUGH.
EDWARD M. SHARP.

Witnesses:
WM. BLAND,
J. C. MUNSON.